United States Patent
Li et al.

(10) Patent No.: US 11,775,956 B2
(45) Date of Patent: Oct. 3, 2023

(54) NON-CONTACT COMMUNICATION METHOD AND COMMUNICATION DEVICE

(71) Applicant: China UnionPay Co., Ltd., Pudong New Area Shanghai (CN)

(72) Inventors: Dingzhou Li, Pudong New Area Shanghai (CN); Shuo He, Pudong New Area Shanghai (CN); Cheng Peng, Pudong New Area Shanghai (CN); Jintan Wu, Pudong New Area Shanghai (CN); Quan Sun, Pudong New Area Shanghai (CN); Wei Guo, Pudong New Area Shanghai (CN); Limin Zhang, Pudong New Area Shanghai (CN)

(73) Assignee: China UnionPay Co., Ltd., Shanghai (CN)

( * ) Notice: Subject to any disclaimer, the term of this patent is extended or adjusted under 35 U.S.C. 154(b) by 287 days.

(21) Appl. No.: 16/973,759

(22) PCT Filed: Apr. 12, 2019

(86) PCT No.: PCT/CN2019/082487
§ 371 (c)(1),
(2) Date: Dec. 9, 2020

(87) PCT Pub. No.: WO2019/237814
PCT Pub. Date: Dec. 19, 2019

(65) Prior Publication Data
US 2021/0256499 A1 Aug. 19, 2021

(30) Foreign Application Priority Data

Jun. 11, 2018 (CN) .......................... 201810593405.9

(51) Int. Cl.
*G06Q 20/00* (2012.01)
*G06Q 20/32* (2012.01)
(Continued)

(52) U.S. Cl.
CPC ....... *G06Q 20/3278* (2013.01); *G06Q 20/352* (2013.01); *H04L 63/0884* (2013.01); *H04W 4/80* (2018.02); *H04W 12/02* (2013.01)

(58) Field of Classification Search
CPC ..... H04W 12/40; H04W 12/02; H04W 12/47; H04W 4/80; H04L 63/0884;
(Continued)

(56) References Cited

U.S. PATENT DOCUMENTS 10,728,728 B2 * 7/2020 Levionnais ........ G06Q 20/3552
2016/0234176 A1 8/2016 Chu et al.
(Continued)

FOREIGN PATENT DOCUMENTS

| CN | 102402744 A | 4/2012 |
| CN | 103745155 A | 4/2014 |

(Continued)

OTHER PUBLICATIONS

Int'l Search Report and Written Opinion dated Jul. 10, 2019 in Int'l Application No. PCT/CN2019/082487, translation of Int'l Search Report only.
(Continued)

*Primary Examiner* — Scott S Trotter
(74) *Attorney, Agent, or Firm* — Nixon & Vanderhye P.C.

(57) ABSTRACT

A non-contact communication method and a communication device are presented. The communication device includes a trusted execution environment (TEE). A first security application and a second security application are provided in a security element of the communication device. The first security application and an application in the trusted execu- (Continued)

tion environment are communicationally connected by means of a first communication channel. The second security application and a near-field communication (NFC) module provided in the communication device are communicationally connected by means of a second communication channel. The first security application and the second security application are communicationally connected by means of a security channel. Using the non-contact communication method and the communication device, a security channel may be established between NFC and a TEE, which may enable NFC non-contact card reading for a TEE application.

11 Claims, 2 Drawing Sheets

(51) Int. Cl.
  *H04W 4/80* (2018.01)
  *G06Q 20/34* (2012.01)
  *H04L 9/40* (2022.01)
  *H04W 12/02* (2009.01)

(58) Field of Classification Search
  CPC ............. G06Q 20/3227; G06Q 20/352; G06Q 20/3223; G06Q 20/326; G06Q 20/353; G06Q 20/3278; G06F 21/606; G06F 21/53
  See application file for complete search history.

(56) References Cited

U.S. PATENT DOCUMENTS

| | | | |
|---|---|---|---|
| 2017/0366925 | A1 | 12/2017 | Guo et al. |
| 2018/0139596 | A1 | 5/2018 | Chen et al. |

FOREIGN PATENT DOCUMENTS

| | | | |
|---|---|---|---|
| CN | 104778794 | A | 7/2015 |
| CN | 105117908 | A | 12/2015 |
| CN | 105472546 | A | 4/2016 |
| CN | 105793861 | A | 7/2016 |
| CN | 106650461 | A | 5/2017 |
| CN | 109155777 | A | 1/2019 |
| EP | 3101607 | A1 | 12/2016 |

OTHER PUBLICATIONS

Office Action dated Jan. 19, 2022 in European Application No. 19820177.4.
Office Action dated Mar. 23, 2020 in Chinese Application No. 201810593405.9 ( No Translation, Shown for relevence).
First Office Action dated Apr. 1, 2020 in Chinese Application No. 201810593405.9, with English translation, 12 pages.

* cited by examiner

NON-CONTACT COMMUNICATION METHOD AND COMMUNICATION DEVICE

CROSS-REFERENCE TO RELATED APPLICATIONS

This application is the U.S. national phase of International Application No. PCT/CN2019/082487, filed Apr. 12, 2019, now expired, which was published in the Chinese language on Dec. 19, 2019, under International Publication No. WO 2019/237814, which claims priority under 35 U.S.C. § 119(b) to Chinese Application No. 201810593405.9, filed Jun. 11, 2018, the contents of which applications are incorporated by reference herein.

TECHNICAL FIELD

The present disclosure relates to communication technologies, in particular to a non-contact communication method applied between Near field communication (NFC) modules in a trusted execution environment and a communication device implementing the same.

BACKGROUND

The trusted execution environment (TEE) technology may provide smart terminals such as a mobile phone with a trusted execution environment/operating system isolated and protected by hardware. Security-related applications on the smart terminal, which are namely TEE applications, may be executed in the TEE to ensure security.

NFC, which is a short distance wireless communication technology, is based on a radio frequency identification (RFID) technology and may be utilized to implement short distance communication between smart terminals through magnetic field induction.

In the prior art, implementations of the NFC are mainly performed on the Android system, and NFC-based non-contact card reading has not yet been implemented in the TEE.

To implement application scenarios having high requirements on security of the NFC card reading, such as the case of a mobile phone POS or the like, it may be considerable to adopt the TEE to ensure security of the non-contact communication. However, no existing technology can enable the direct connection of the NFC to the TEE.

SUMMARY

In view of the aforesaid problems, the present disclosure aims to provide a non-contact communication method and a communication device, which is based on a security element and capable of communicationally connecting the NFC device directly to the TEE.

The communication device according to the present disclosure comprises a trusted execution environment, wherein a security element is provided with a first security application and a second security application, the security element referring to a security element provided in the communication device or a security element separated from the communication device (such as, a relationship between the mobile phone and the SIM card).

Wherein the first security application is communicationally connected to an application in the trusted execution environment via a first communication channel;

the second security application is communicationally connected to an NFC module provided in the communication device via a second communication channel; and the first security application is communicationally connected to the second security application via a security channel.

In an implementation, the security channel implements communication by means of SIO.

In an implementation, the first communication channel is a contact communication channel, and the second communication channel is a non-contact communication channel.

In an implementation, the first security application and the second security application are configured with open SIO interface authority at a lower layer, so that the first security application and the second security application are allowed to perform contact communication and non-contact communication in parallel.

In an implementation, the contact communication channel is implemented via Serial Peripheral Interface (SPI), and the non-contact communication channel is implemented via NFC protocol.

In an implementation, the first security application receives and forwards a request transmitted via the contact communication channel to the second security application and in turn receives a reverse request from the second security application; and after receiving the request transmitted via the contact communication channel, the first security application establishes communication with the second security application by means of the SIO and sends a card detection request; and the NFC module performs verification on the second security application when the card detection request from the first security application is received by the second security application, and if the verification succeeds, the second security application is authorized and sends the card detection request via the non-contact communication channel.

In an implementation, when the second security application performs non-contact communication through the non-contact communication channel, the first security application maintains contact communication through the contact communication channel.

In an implementation, the NFC module is provided with an NFC protocol stack; and the NFC protocol stack is configured to support a Card emulation mode and a Reader mode.

The communication device according to the present disclosure comprises a trusted execution environment, wherein a security element is provided with a security application that supports both contact communication and non-contact communication.

In an implementation, a communication logic of the security application is defined to support concurrent processing of the contact communication and the non-contact communication and also defined to have a capacity of supporting interruption.

A smart terminal according to the present disclosure, comprising the aforesaid communication device.

A non-contact communication method according to the present disclosure, which is a non-contact communication method for performing communication between an application in a trusted execution environment and an NFC module, comprising:

a first sending step, in which the application in the trusted execution environment sends a request via a first communication channel to a first security application provided in a security element;

a second sending step, in which the first security application receives and sends the request via a security communication channel to a second security application provided in the security element;

a card detection requesting step, in which the second security application receives the request and sends a card detection request to the NFC module via a second communication channel;

a card detecting step, in which the NFC module returns relevant card data to the second security application via the second communication channel after receiving the card detection request and detecting an NFC card;

a third sending step, in which the second security application returns the card data to the first security application via the security communication channel; and a fourth sending step, in which the first security application returns the card data to the application in the trusted execution environment via a first security communication channel.

Optionally, the security communication channel is implemented by means of Serial Input/Output (SIO), the first communication channel is a contact communication channel, and the second communication channel is a non-contact communication channel.

Optionally, in the card detection requesting step, the NFC module performs verification on the second security application when the card detection request from the first security application is received by the second security application, and if the verification succeeds, the second security application is authorized and sends the card detection request to the NFC module via the second communication channel.

The non-contact communication method and communication device of the present disclosure realize security transmission of the data between NFC and TEE by designing two security applications in the security element (SE), wherein one security application is responsible for contact communication with TAs in the TEE via SPI or other channels, and the other security application is responsible for non-contact communication with external non-contact cards via the NFC. According to the present disclosure, the non-contact communication card reading method for TEE-based application may be implemented by means of SE, which indirectly constructs a closed loop for security communication regarding the non-contact communication from NFC to TEE, and thereby provides a broader and safer protection guarantee for financial non-contact mobile payment.

According to the present disclosure, a special channel from TEE to NFC can be established, which solves the current problem in industry that NFC can only be connected to the Android system and fails to directly connect to TEE.

BRIEF DESCRIPTION OF THE DRAWINGS

The foregoing summary, as well as the following detailed description of the preferred invention, will be better understood when read in conjunction with the appended drawings.

DETAILED DESCRIPTION OF THE EMBODIMENTS

Some of various embodiments of the present disclosure are described below for the purpose of providing general understanding of the present disclosure, but are not intended to identify the key or decisive elements of the present disclosure or limit the claimed protection scope.

Before describing the specific embodiments of the present disclosure, some technical terms presenting in the present disclosure will be described and explained below.

Trusted execution environment (TEE) refers to a secure operating system which is based on hardware security assurance and runs in parallel with a rich media operating system such as Android running on smart terminals.

Security element (SE) is typically provided in a form of a chip, configured to prevent external malicious analysis attacks and ensure data security, and formed with an encryption/decryption logic circuit. Applications in the SE are generally referred to as Applets.

Near field communication (NFC) refers to a short distance high-frequency wireless communication technology that allows electronic devices to perform non-contact point-to-point data transmission therebetween (at a distance within ten centimeters) to exchange data. NFC generally operates in three modes, i.e. a Card emulation mode, a Reader mode and a P2P mode.

The Card emulation mode enables an NFC devices to operate like a smart card.

The Reader/write mode allows the NFC devices to read relevant information from NFC tags.

Trusted Applet (TA) refers to an application provided in the TEE.

Aiming at the problem in the prior art that the TEE cannot be in direct communication with the NFC, the inventive concept of the present disclosure is to provide an SE-based non-contact card reading method for TEE applications. The concept mainly includes the following contents:

An SE, serving as an intermediate bridge, is provided with two applications (namely two security applications), one of which employs the existing communication manner between the SE and a TA and is mainly responsible for the communication of the SE with the TA in the TEE via contact-type channels such as SPI on the terminal, and the other of which employs the existing communication channel between the SE and the NFC and is mainly responsible for reading information of external non-contact cards via the NFC by the SE. In particular, according to the present disclosure, firstly, the existing NFC protocol stack, which is provided with only the Card emulation mode (such as in the Pay products) of the SE, shall be expanded to support the Reader mode of the SE, so that the applications in the SE can serve as a card reader and detect external non-contact cards via the NFC. Then, the applications in the SE may perform communication via interfaces such as SIO, and at this point, the SE shall be configured with open SIO interface authority in the lower layer, so that the two applications in the SE are allowed to simultaneously perform contact and non-contact communication in parallel.

Figure 1:
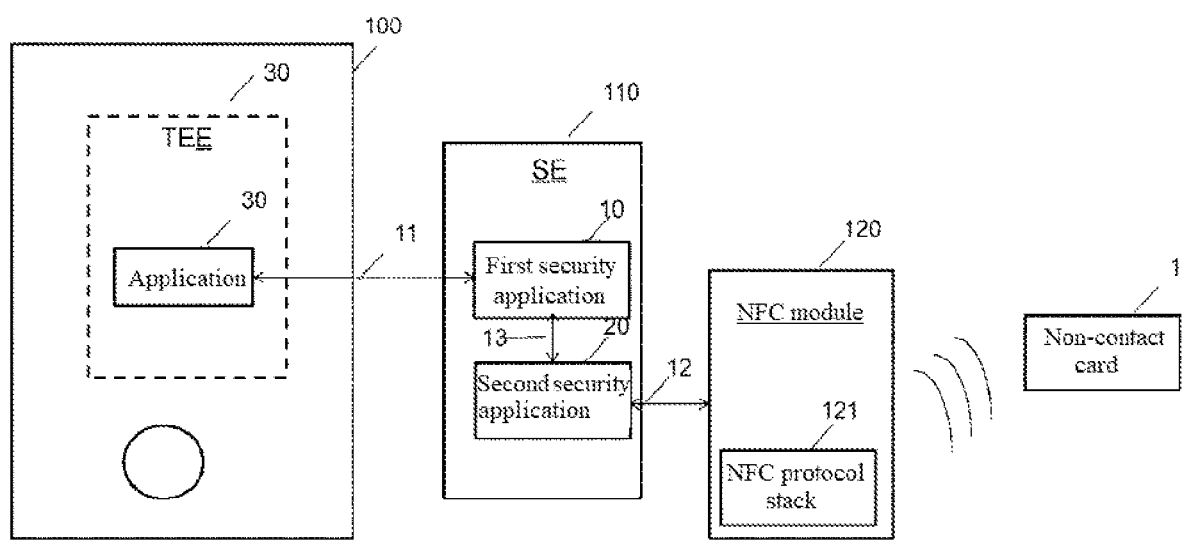
FIG. 1 is a schematic diagram illustrating a structure of a communication device according to an embodiment of the present disclosure.

FIG. 1 is a schematic diagram illustrating a structure of a communication device according to an embodiment of the present disclosure. In this embodiment, a mobile terminal (such as, a mobile phone) is taken as an example of the communication device for illustration.

As illustrated in FIG. 1, the mobile terminal 100 comprises a Trusted Execution Environment (TEE). A security element 110 is provided, and the security element 110 may be a security element provided in the mobile terminal 100 or a security element separated from the mobile terminal 100 (like the relationship between a mobile phone and a security element such as a SIM card, for example). The mobile terminal 100 further comprises an NFC module 120 for NFC communication. In FIG. 1, in order to show the security element 110 and the NFC module 120 more clearly, the security element 110 and the NFC module 120 are shown outside the mobile terminal 100. The security element (SE) 110 is provided with a first security application 10 and a second security application 20. The first security application 10 and the second security application 20 herein are two security applications provided in the security element, which are hereinafter simply referred to as Application 1 and Application 2 (or Applet1 and Applet 2).

The first security application 10 is communicationally connected to an application (hereinafter referred to as TA) 30 in the trusted execution environment via a first communication channel 11. The second security application is communicationally connected to the NFC module 120 via a second communication channel 12, and the first security application 10 is communicationally connected to the second security application 20 via a security channel 13.

Specifically, the security channel 13 performs communication between the first security application 10 and the second security application 20 via an SIO interface. The first security application 10 and the second security application 20 are configured with open SIO interface authority at a lower layer, so that the first security application 10 and the second security application 20 are allowed to perform contact communication and non-contact communication in parallel.

The first communication channel 11 for communication between the first security application 10 and the application 30 is a contact communication channel and implemented via SPI. The second communication channel 12 for communication between the second security application 20 and the NFC module 120 of the mobile terminal 100 is a non-contact communication channel, which may for example realize the communication between the security application 20 and the NFC module 120 based on the NFC protocol.

The NFC module 120 has an NFC protocol stack 121. In order to enable the second security application 20 to serve as a card reader and detect external non-contact cards (non-contact card 1 in FIG. 1) via NFC, the NFC protocol stack 121 in the present disclosure is configured to support both the Card emulation mode and the Reader mode.

On one hand, the first security application 10 receives and sends a request transmitted via the first communication channel 11 to the second security application 20. On the other hand, the first security application 10 receives a reverse request of the second security application 20. In addition, after receiving the request transmitted via the first communication channel 11, the first security application 10 establishes communication with the second security application 20 by means of SIO (i.e., a security communication channel 13) and sends a card detection request. After the second security application 20 receives the card detection request from the first security application 10, the NFC module 120 verifies whether the second security application 20 supports the Reader mode, and if the verification succeeds (i.e., supporting the Reader mode), the second security application 20 is authorized and sends the card detection request to the NFC module 120 via the second communication channel 12.

When the second security application 20 performs non-contact communication with the NFC module 120 via the second communication channel 12, the contact communication between the first security application 10 and the application 30 in the trusted execution environment can be simultaneously maintained via the first communication channel 11.

The following will describe the non-contact communication method implemented by the aforesaid communication device.

Figure 2:
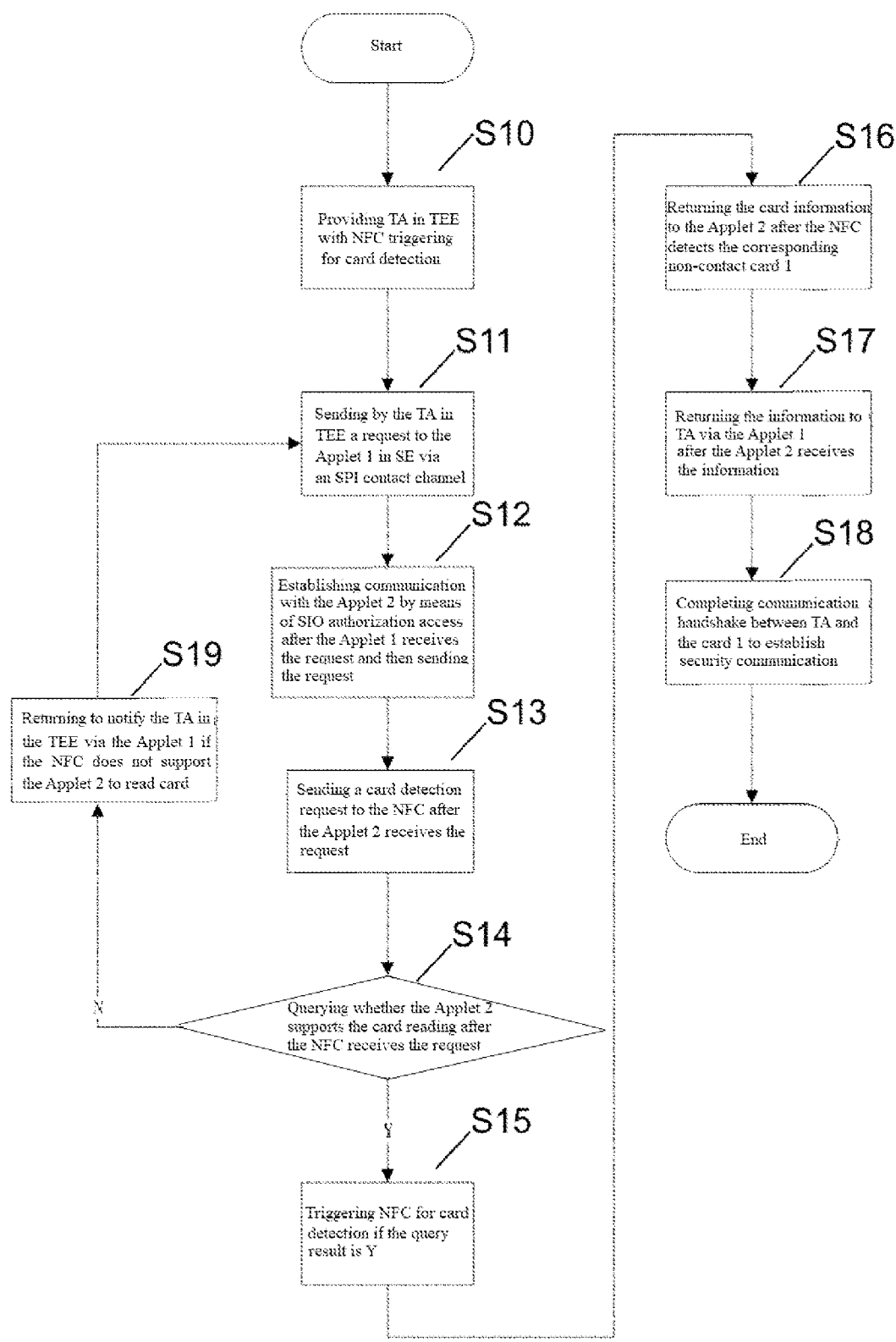
FIG. 2 is a flow chart of a non-contact communication method according to an embodiment of the present disclosure.

FIG. 2 is a flow chart of a non-contact communication method according to an embodiment of the present disclosure.

Reading the non-contact card by the non-contact communication method according to an embodiment of the present disclosure, as shown in FIG. 2, includes following steps. In step S10, the TA (i.e., application 30) in TEE is provided with an NFC triggering for card detection.

In step S11, the TA in TEE sends a request to the Applet 1 (i.e., the first security application 10) in the SE via the contact-type channel such as SPI. The Applet 1 which performs communication with the TA is mainly responsible for processing a TA request from the contact-type channel such as SPI, forwarding the TA request to the Applet 2 (i.e., the second security application 20), and processing a reverse request, etc. In addition, the Applet 1 may play a certain functional processing role according to implementation requirements, such as storing keys, message parsing, and the like.

In step S12, the Applet 1 establishes communication with the Applet 2 by means of SIO authorization access after receiving the request, and then sends the request.

In step S13, the Applet 2 sends a card detection request to the NFC module after receiving the request.

In step S14, the NFC module queries whether the Applet 2 supports the card reading after receiving the request. If the query result is yes (Y), step S15 is executed, and if the query result is no (N), step S19 is executed. After receiving the card detection request from the Applet 1, the Applet 2 may continue to send the request to the NFC module after verifying the authorization (step S14). It should be noted that the communication between the Applet 1 and the TA shall be kept continuously. Furthermore, the NFC module queries the NFC protocol stack to confirm whether the Applet 2 supports the Reader mode after receiving the card detection request from the Applet 2. The NFC-based non-contact card detection behavior can only be started when it is confirmed that the Reader mode is supported, and if the Reader mode is not supported, the access request will be rejected.

In step S19, the Applet 2 returns to notify the TA in the TEE via the Applet 1.

In step S16, the NFC module returns the card information to the Applet 2 after detecting the corresponding non-contact card 1.

In step S17, the Applet 2 receives and returns the information to TA 30 in the TEE via the Applet 1.

In step S18, TA completes handshake communication with the non-contact card 1 and establishes security communication. Specifically, as shown in step S16 and step S17, the card ID, PSE and other information of the non-contact card 1 are obtained and returned to the TA via the Applet 2 and Applet 1 to complete the subsequent communication handshake and related security operations such as establishment of a security channel. Similarly, after establishing the security communication handshake from TEE to the non-contact card, the communication therebetween may be kept to process the related security data including transaction information and user passwords.

Variations

The following will describe a modification of the communication device of the present disclosure.

The communication device according to this modification also includes a trusted execution environment. A security element of the communication device is provided with a security application that supports both contact communication and non-contact communication. That is, the contact and non-contact processing is implemented with one security application.

For example, the SE communication logic is specifically defined in a physical lower layer of the SE to support both contact and non-contact concurrent processing, and only one security application is adopted to complete the communication with the application 30 in TEE and the communication with the non-contact smart card 1 via the NFC module 120. However, the SE shall have a capability of supporting interruption to ensure seamlessly connection between applications in the TEE and communication data from the NFC module, thereby ensuring the consistency and integrity of the communication and data.

The non-contact communication method and communication device of the present disclosure can realize security transmission of the data between NFC and TEE by designing two security applications in the security element (SE), wherein, one security application is responsible for contact communication with TAs in the TEE via channels, such as SPI, and the other security application is responsible for non-contact communication with external non-contact cards via the NFC, or, as another modification manner, by providing the security element with a security application capable of realizing functions of the two security applications.

Thus, according to the present disclosure, the non-contact communication card reading method for TEE-based application may be implemented by means of SE, which indirectly constructs a safe closed communication loop for the non-contact communication from NFC to TEE, and thereby provides a broader and safer protection guarantee for financial non-contact mobile payment.

The aforesaid examples mainly illustrate the non-contact communication method and the communication device of the present disclosure. Although only some of the specific embodiments of the present disclosure have been described, those skilled in the art should understand that the present disclosure can be implemented in many other forms without departing from the spirit and scope. Thus, examples and implementations as shown are illustrative rather than restrictive, and the present disclosure may cover various modifications and substitutions without departing from the spirit and scope of the present disclosure as defined by the appended claims.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A communication device, comprising a trusted execution environment, wherein
   a security element is provided with a first security application and a second security application;
   wherein the first security application is communicationally connected to an application in the trusted execution environment via a first communication channel;
   the second security application is communicationally connected to an NFC module provided in the communication device via a second communication channel;
   the first security application is communicationally connected to the second security application via a security channel; and
   the security channel implements communication by means of SIO.

2. The communication device of claim 1, wherein the first communication channel is a contact communication channel, and the second communication channel is a non-contact communication channel.

3. The communication device of claim 1, wherein the first security application and the second security application are configured with open SIO interface authority at a lower layer, so that the first security application and the second security application are allowed to perform contact communication and non-contact communication in parallel.

4. The communication device of claim 1, wherein the contact communication channel is implemented via SPI, and the non-contact communication channel is implemented via NFC protocol.

5. The communication device of claim 1, wherein the first security application is configured to receive and send a request transmitted via the contact communication channel to the second security application and in turn receive a reverse request from the second security application, and wherein after receiving the request transmitted via the contact communication channel, the first security application establishes communication with the second security application by means of the SIO and sends a card detection request; and
the NFC module is configured to perform verification on the second security application when the card detection request from the first security application is received by the second security application, and if the verification succeeds, the second security application is authorized and sends the card detection request via the non-contact communication channel.

6. The communication device of claim 4, wherein when the second security application performs non-contact communication through the non-contact communication channel, the first security application maintains contact communication through the contact communication channel.

7. The communication device of claim 1, wherein the NFC module is provided with an NFC protocol stack; and
the NFC protocol stack is configured to support a Card emulation mode and a Reader mode.

8. The communication device of claim 1, wherein a communication logic of the security application is defined to support concurrent processing of the contact communication and the non-contact communication and further defined to have a capacity of supporting interruption.

9. A non-contact communication method for performing communication between an application in a trusted execution environment and an NFC module, comprising:
   a first sending step, in which the application in the trusted execution environment sends a request via a first communication channel to a first security application provided in a security element;
   a second sending step, in which the first security application receives and sends the request via a security communication channel to a second security application provided in the security element;

a card detection requesting step, in which the second security application receives the request and sends a card detection request to the NFC module via a second communication channel;

a card detecting step, in which the NFC module returns relevant card data to the second security application via the second communication channel after receiving the card detection request and detecting an NFC card;

a third sending step, in which the second security application returns the card data to the first security application via the security communication channel; and a fourth sending step, in which the first security application returns the card data to the application in the trusted execution environment via a first security communication channel; and the security communication channel is implemented by means of SIO.

10. The non-contact communication method of claim 9, wherein the first communication channel is a contact communication channel; and the second communication channel is a non-contact communication channel.

11. The non-contact communication method of claim 9, wherein in the card detection requesting step, the NFC module performs verification on the second security application when the card detection request from the first security application is received by the second security application, and if the verification succeeds, the second security application is authorized and sends the card detection request to the NFC module via the second communication channel.

* * * * *